UNITED STATES PATENT OFFICE.

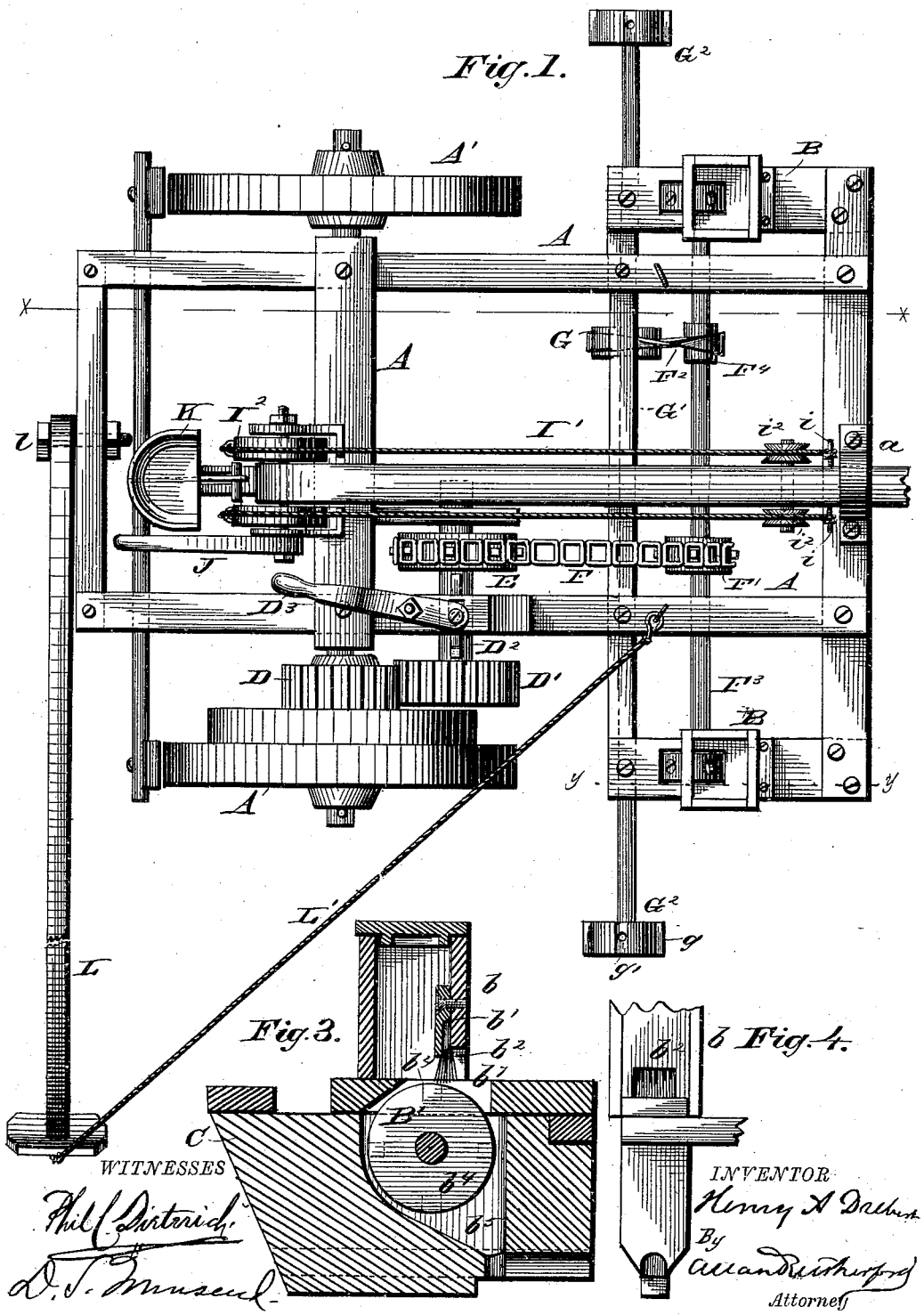

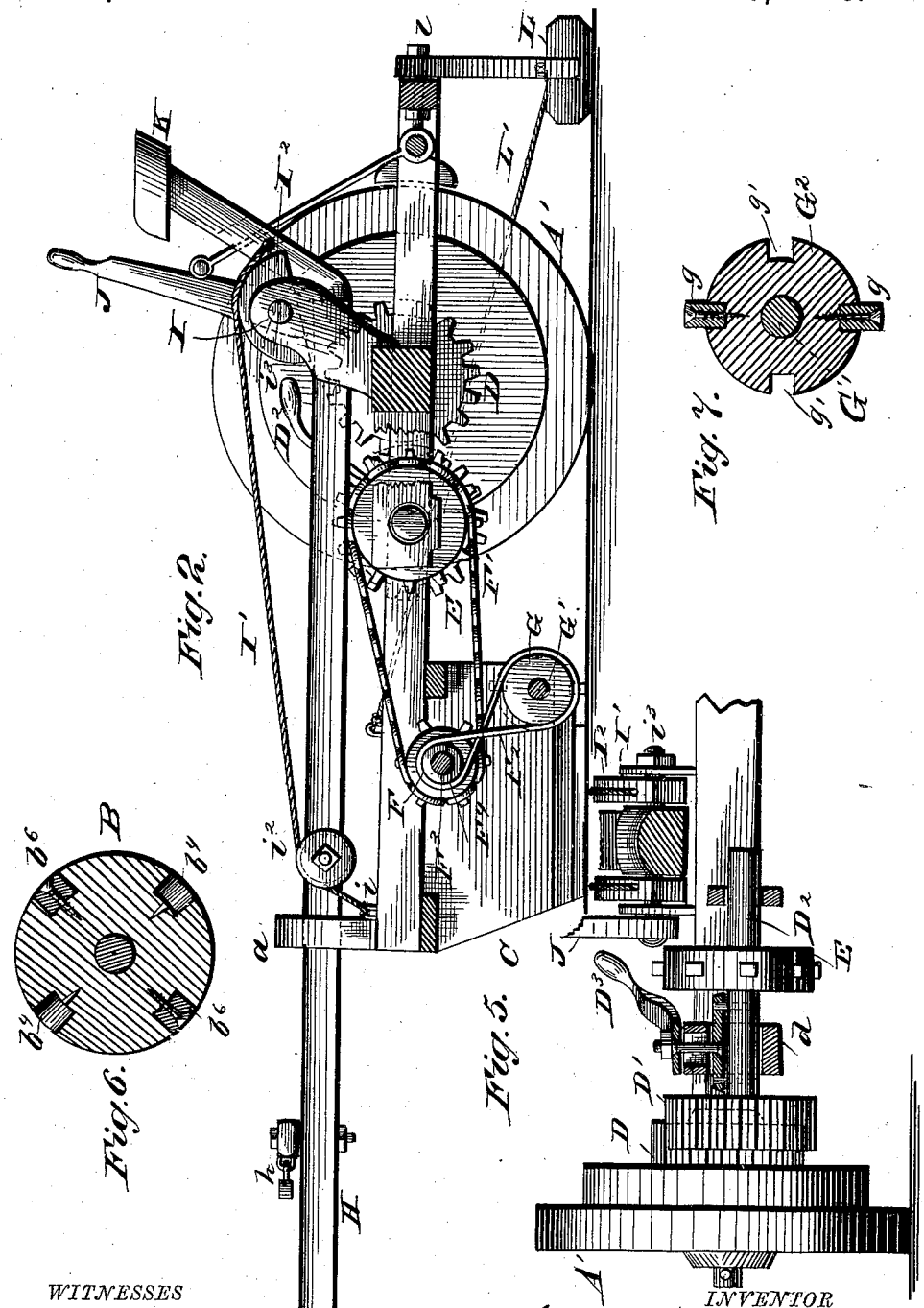

HENRY A. DREBERT, OF WEST POINT, NEBRASKA.

SEED-PLANTER.

SPECIFICATION forming part of Letters Patent No. 343,571, dated June 15, 1886.

Application filed March 9, 1886. Serial No. 194,650. (No model.)

*To all whom it may concern:*

Be it known that I, HENRY A. DREBERT, a citizen of the United States, residing at West Point, in the county of Cuming and State of Nebraska, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to seed-planters; and the novelty consists in the construction, arrangement and adaptation of parts, as will be more fully hereinafter set forth, and specifically pointed out in the claims.

The invention is fully illustrated in the accompanying drawings, which form a part of this specification, and in which—

Figure 1 is a top plan view. Fig. 2 is a vertical longitudinal section taken on the line $x$ $x$ of Fig. 1. Fig. 3 is a detail section taken through the seed-dropper and on the line $y$ $y$ of Fig. 1. Fig. 4 is a transverse elevation of the seed-dropper. Fig. 5 is an elevation, partly in section, of the driving mechanism and means for throwing it out of gear. Fig. 6 is a detail section of the seed-wheel, and Fig. 7 is a similar view of one of the hill-marking disks.

Referring to the drawings, A designates the main frame, carried on bearing-wheels A'. In front of each wheel, and rigid with the frame, is a furrow opener or plow, C, at the rear of which is a seed-aperture, $b^5$.

B designates in general the seed-dropping devices, and these consist, essentially, of a hopper, $b$, upon the inner surface of which, by a plate, $b'$, is confined a layer of stiff bristles or hairs, $b^2$, forming the cut-off. This layer of bristles covers, in part, a passage which connects the interior of the hopper with the space or recess $b^7$, which terminates in the seed-apertures $b^5$.

Within the space $b^7$ revolves a feed-wheel, B, which has in its periphery a series of equidistant recesses, $b^4$, adapted to receive and carry a sufficient number of the seed to form a hill from the hopper to the seed-apertures $b^7$ $b^5$, from whence the said seed are deposited into the furrow made by the plow or opener C in front of each wheel A'. The wheels A' are equipped in any well-known manner to serve as covers for the seed.

Rigid with one of the bearing-wheels, which also serves as a driver, is a gear-wheel, D, which, when the machine is in operation, is caused to mesh with a similar gear-wheel, D'. This wheel D' is hung on a sleeve, $d$, which, by any ordinary spline-connection, is forced to revolve with its axle $D^2$, and upon this axle is rigidly journaled a sprocket-wheel, E, the purposes of which will be explained later.

A lever, $D^3$, within easy reach of the driver's seat K, is connected with the sleeve $d$, and by a proper manipulation may be employed to throw the wheel D' out of mesh with the wheel D of the driver, and this operation will leave the axle D and its train of devices idle.

By a chain, F, I connect the sprocket-wheel E with a sprocket-wheel, F', of one-half of the diameter of the wheel E, and journaled on the transverse shaft $F^3$. This shaft carries rigidly both the seeding-disks B', and also carries a small pulley, $F^4$, which, by a cross-belt, $F^2$, is connected to a pulley, G, carried rigidly upon a marker-shaft, G', journaled in the main frame A, and carrying upon either end a marker-disk, $G^2$.

Each marker-disk $G^2$ is provided with a number of apertures, $g'$, for the reception of removable pins $g$, to correspond with the number of seed-apertures $b^4$ in the seed-wheel B'. If it is desired to plant closely, the apertures or seed-pockets will all be left open; but if it is desired to plant with hills farther apart, every alternate seed-pocket $b^4$ may be filled with a proper plug, as $b^6$.

I provide that the holes $g'$ in the marker-disks may be filled by markers $g$, which extend beyond the periphery of the disks, and these markers $g$ may be quickly and easily made to correspond with the planting-wheels B'. I attach importance upon this part of the device. It will be noticed that the wheels D, D', and E are of a size, that the wheels F and G are of one-half that size, and the wheel F or pulley $F^4$ is one-fourth the size of the wheel D'; hence the shaft $F^3$ will revolve twice while the the wheels A' revolve once, and the marker-disks will revolve to correspond with the wheels A'. The marker-disks G² are placed slightly in the rear of the seeding devices, and as the entire machine travels across the field this distance is such that the marker will be in proper position to mark opposite the point where the seed has been deposited in the furrow. The tongue H has a draft-attachment, $h$, and is pivoted above the main axle, between two standards, I. It extends through a frame, $a$, upon the front of the main frame, and has upon either side a pulley, $i^2$. At points $i$ upon the main frame are secured ropes I', which, passing over the pulleys $i^2$, are carried rearward and secured to the rear of semicircles I. These half circles are mounted rigidly upon a shaft, $i^3$, journaled in the standards I, and a lever, J, within easy reach of the driver, serves to apply such tension upon these ropes I' as to adjust the frame, and consequently the plows C to deep or shallow work, as occasion may determine.

L designates a reversible marker, pivoted at $l$ to the rear of the machine, and L' a cord by which it is secured to a point forward.

What I claim as new is—

1. In a seed-planting machine, the combination, with the revolving seed-wheels B', having apertures $b^4$, and with a hill-marking disk having apertures $g'$, for the reception of removable pins $g$, of a cross-belt, as F², connecting the shafts of these devices, and connections for obtaining power from the bearing-wheels, as set forth.

2. The combination, with the wheel A', gears D D', shaft D², and sprocket-wheel E, of the shaft F³, carrying the seed-wheels B', having apertures $b^4$ and connected to said wheel E by a pulley of one-half of its diameter, the shaft G', carrying the markers G², having aperture $g'$, and the cross-belt F², all arranged and operating as set forth.

In testimony whereof I affix my signature in presence of two witnesses.

HENRY A. DREBERT.

Witnesses:
B. H. SCHABERG,
NIELS LARSEN.